United States Patent
Delfs et al.

(10) Patent No.: US 7,379,863 B2
(45) Date of Patent: May 27, 2008

(54) METHOD AND DEVICE FOR REDUCING SCHEDULING DELAY IN A DIGITAL COMMUNICATION SYSTEM

(75) Inventors: Eckhard Delfs, Nuernberg (DE); Emilian Ertel, Nuernberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 903 days.

(21) Appl. No.: 10/409,961

(22) Filed: Apr. 9, 2003

(65) Prior Publication Data

US 2004/0204932 A1   Oct. 14, 2004

(51) Int. Cl.
*G10L 21/00* (2006.01)
*H04Q 7/00* (2006.01)
*H04Q 7/20* (2006.01)
*H04B 7/212* (2006.01)

(52) U.S. Cl. .................. 704/201; 370/328; 370/348; 455/450; 455/452.1; 704/500; 704/227

(58) Field of Classification Search ............... 704/500, 704/227
See application file for complete search history.

(56) References Cited

U.S. PATENT DOCUMENTS 5,914,950 A * 6/1999 Tiedemann et al. ......... 370/348
6,205,125 B1 * 3/2001 Proctor et al. .............. 370/328
7,164,919 B2 * 1/2007 Chen ....................... 455/452.2
2002/0055356 A1 * 5/2002 Dulin et al. ................ 455/422
2003/0100314 A1 * 5/2003 Czaja et al. ................ 455/456

* cited by examiner

*Primary Examiner*—Richemond Dorvil
*Assistant Examiner*—Dorothy S Siedler

(57) ABSTRACT

A method and device within a speech processing unit (SPU) for reducing scheduling delay between the SPU and a radio network node. Within the SPU, data packets are processed in a plurality of time slots that are subunits of frames. The device receives timing information from the node that identifies a beginning and an ending of processing periods in the node. The timing information is utilized to select a time slot within each frame as a target time slot. The target time slot has a position within each frame such that the scheduling delay between the ending of a processing period in the node and the beginning of the target time slot is minimized. Data packets for a particular channel are assigned to the target time slot to reduce the scheduling delay. The phase of the frame is then adjusted by erasing superfluous data packets.

7 Claims, 5 Drawing Sheets

METHOD AND DEVICE FOR REDUCING SCHEDULING DELAY IN A DIGITAL COMMUNICATION SYSTEM

FIELD OF THE INVENTION

The present invention relates to a method and a device for reducing the scheduling delay in a digital communication system. More particularly, and not by way of limitation, the invention relates to a method and a device for reducing the scheduling delay between a speech processing unit and one or more radio network nodes.

BACKGROUND ART

Speech processing units are an important part of modern digital communication systems such as, for example, mobile communication systems. These speech processing units are usually located in a switching node of the communication system and consist of a coding entity and a decoding entity, in short: a codec. In many third generation (3G) mobile communication systems, speech processing units are connected to the radio network via packet-switched transmission links. The bandwidth of these transmission links is shared by a large number of speech and/or data channels. Unlike narrow-band circuit-switched links, compressed speech frames can be transported over a packet-switched transmission link in a very short time. For example, in second generation (2G) Global System for Mobile Communications (GSM) systems, the transport of an adaptive multi-rate (AMR) speech packet over a 16-kbps Abis link takes about 17 ms, whereas in the Universal Mobile Telecommunications System (UMTS) the same packet can be sent over a 2-Mbps Iu link in less than 1 ms.

The overall speech signal delay depends on the transmission delay and the scheduling delay between the radio network and the speech processing unit. Since the transmission delay between radio network nodes and speech processing unit is rather small, the speech signal delay between radio network nodes and speech processing unit is mainly limited by the availability of processing capacity of the speech processing unit. The maximum number of channels handled by the speech processing unit is limited by its total processing capacity divided by the speech coding algorithm complexity.

A speech coder provides processing capacity by means of one or several digital signal processors (DSPs). The processing of speech coding algorithms is usually based on small segments, so called frames. Every speech frame of each channel requires a certain amount of time to be processed, both for the uplink and the downlink direction. The processing time of these frames typically ranges between 10 and 20 milliseconds. For example, in GSM all speech codecs, i.e. Full Rate (FR), Enhanced Full Rate (EFR), Half Rate (HR) and Adaptive Multi-Rate (AMR) are based on 20 ms frame processing. The processing window of the speech processing unit is divided into a number of time slots. Some of the time slots in a frame are used for encoding tasks while the remainder are used for decoding tasks.

In a delay-optimised scenario, the processing power of the speech processing unit would be available for each of the channels exactly when needed, that is, each channel would run in an ideal time slot of the processing window, which minimizes the scheduling delay for all channels to be processed by the speech processing unit. In UMTS systems, for example, speech processing units are implemented in media gateways, which are connected to the radio network via asynchronous transfer mode (ATM). Since no synchronisation between the radio network nodes and the speech processing units in the core network exists, the data processing (more specifically, the encoding and decoding tasks in the speech processing unit) in general suffers from severe scheduling delays. These delays exist in the downlink direction from the speech processing unit to the radio network nodes as well as in the uplink direction from the radio network nodes to the speech processing unit.

In the downlink, a time alignment procedure to minimize the buffer delay in a radio network node (for example, a radio network controller (RNC)), is performed between the speech processing unit and the RNC. This time alignment procedure is proposed in the Third Generation Partnership Project (3GPP) standardization document 25.415 and is mainly based on a 'request/acknowledge scheme'. That means, the radio network node orders the offset correction in the uplink direction, and the speech coder executes and acknowledges the time alignment in the downlink direction. By such a time alignment request, a specific encoding or decoding task is assigned to a new time slot in the speech processing unit. The time slot, which yields minimal scheduling delay for further processing of a data packet, is called the target time slot.

The problem with this procedure is that the radio network node is not aware whether the speech processing unit is able to fulfil the request at the moment it is requested to do so. Since the speech processing unit supports several channels simultaneously, the target time slot minimizing the scheduling delay may currently be used for processing another user's data packet. This is even more likely when the speech processing unit is heavily loaded, for example during so called 'busy-hours'. In this case, the speech processing unit returns a 'time alignment not possible' to the requesting radio network node. As described in the 3GPP standardization document 25.415, this problem is currently being solved by repeating the time alignment request for a certain number of times. However, it is fairly unlikely that the moment that any of these time alignment requests is received at the speech processing unit will exactly match the moment that the speech processing unit releases the target time slot (or another delay-reducing time slot) for processing. On the other hand, too many time alignment requests in short intervals will result in a lot of unnecessary traffic between the speech processing unit and the radio network nodes.

In the uplink, there also exists a certain probability that data packets coming from a radio network node may be processed with severe scheduling delays in the speech processing unit.

The above described problems in downlink and uplink transmission exist both in the case of a single radio network node communicating with a speech processing unit, and in the case of multiple radio network nodes communicating with a single speech processing unit.

There is a need for a method and a device for efficiently reducing the scheduling delay of data packets between a speech processing unit and one or several radio network nodes in a digital communication system in the downlink direction as well as in the uplink direction, and also for reducing the roundtrip delay, i.e. the combination of scheduling delay in the uplink and downlink directions.

SUMMARY OF THE INVENTION

It is therefore an object of the present invention to overcome the above mentioned problems and to provide a method of reducing a scheduling delay between a speech processing unit and a radio network node, wherein data packets associated with a channel are processed in the speech processing unit in a plurality of time slots that are subunits of frames. The method includes the steps of receiving timing information from the radio network node that identifies a beginning and an ending of processing periods in the radio network node; and selecting in the speech processing unit, one of the time slots within a first frame as a target time slot. The target time slot has a position within the first frame such that the scheduling delay between the ending of a processing period in the radio network node and the beginning of the target time slot is minimized. This is followed by assigning a data packet associated with the channel to the target time slot within the first or a subsequent frame such that the scheduling delay is reduced; and adjusting the phase of the frame after assigning the data packet to the target time slot by erasing superfluous data packets. With this method, the scheduling delay between a speech processing unit and a radio network node is efficiently reduced, time alignment is performed in an efficient manner, and unnecessary time alignment requests, which may not be fulfilled when requested, are avoided.

In another aspect, the present invention is directed to a computer program product comprising code portions run on a computing device for reducing a scheduling delay between a speech processing unit and a radio network node. Data packets associated with a channel are processed in the speech processing unit in a plurality of time slots that are subunits of frames. The computer program product includes a timing code portion in the speech processing unit that receives timing information from the radio network node. The timing information identifies a beginning and an ending of processing periods in the radio network node. A selecting code portion in the speech processing unit selects one of the time slots within a first frame as a target time slot. The target time slot has a position within the first frame such that the scheduling delay between the ending of a processing period in the radio network node and the beginning of the target time slot is minimized. The computer program product also includes an assigning code portion that assigns a data packet associated with the channel to the target time slot within the first or a subsequent frame such that the scheduling delay is reduced; and an adjusting code portion that adjusts the phase of the frame after assigning the data packet to the target time slot by erasing superfluous data packets.

In yet another aspect, the present invention is directed to a device within a speech processing unit for reducing a scheduling delay between the speech processing unit and a radio network node, wherein data packets associated with a channel are processed in the speech processing unit in a plurality of time slots that are subunits of frames. The device includes means for receiving timing information from the radio network node that identifies a beginning and an ending of processing periods in the radio network node; and means for utilizing the timing information to select one of the time slots within a first frame as a target time slot. The target time slot has a position within the first frame such that the scheduling delay between the ending of a processing period in the radio network node and the beginning of the target time slot is minimized. The device also includes means for assigning a data packet associated with the channel to the target time slot within the first or a subsequent frame such that the scheduling delay is reduced; and means for adjusting the phase of the frame after assigning the data packet to the target time slot by erasing superfluous data packets.

BRIEF DESCRIPTION OF THE DRAWINGS

In the following section, the invention will be described with reference to exemplary embodiments illustrated in the figures, in which.

DETAILED DESCRIPTION OF PREFERRED EMBODIMENTS

Figure 1:
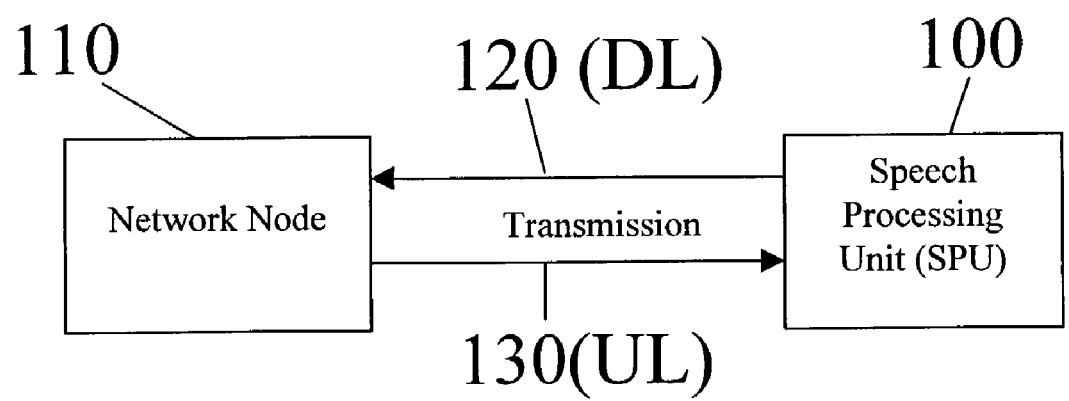
FIG. 1 is a block diagram of a speech processing unit and a radio network node.

In the following description, for purposes of explanation and not limitation, specific details are set forth, such as particular embodiments, circuits, signal formats etc. in order to provide a thorough understanding of the present invention. It will be apparent to one skilled in the art that the present invention may be practiced in other embodiments that depart from these specific details. In particular, while the different embodiments described herein below are incorporated in a Wideband Code Division Multiple Access (WCDMA) communication system, the present invention is not limited to such an implementation, but may be also used in other communication systems such as, for example the General Packet Radio Service (GPRS) or Enhanced Data rates for GSM Evolution (EDGE) systems. Moreover, those skilled in the art will appreciate that the functions explained herein below may be implemented using individual hardware circuitry, using software functioning in conjunction with a programmed microprocessor or general purpose computer, using an application specific integrated circuit (ASIC), and/or using one or more digital signal processors (DSPs).

With respect to assigning a data packet of a specific channel to a new time slot position (as compared to the original time slot position associated with the same channel) it is apparent to someone skilled in the art that making use of free time slots which are not in use by the speech processing unit in the first or subsequent frames is the most straightforward approach. The advantage of this procedure is that it can easily be implemented and does not have any impact on the processing of other users' data in the speech processing unit.

However, if the speech processing unit experiences a heavy load due to high data traffic, the situation may occur, for example, that there are no free time available, or only a few free time slots in each frame are available, which may yield the same or an even increased scheduling delay if used to process the data packets of the channel for which time alignment has been requested. In this case, some or all of the time slots within a frame may be rearranged in order to provide a time slot with reduced scheduling delay to the data packet of the channel for which time alignment has been requested. It is apparent to one skilled in the art, that various schemes or algorithms may be applied in order to do the above mentioned rearrangement. These may vary from being easily implemented schemes to very sophisticated algorithms. The advantage of this procedure is that it can be applied in any situation and at any time, even if the speech processing unit experiences high processing load as in so called 'busy-hours'.

Even if the scheduling delay can be reduced for a certain channel for a first frame, it may also be possible that the scheduling delay may be further reduced for the same channel by assigning data packets of the above channel to new time slots, and then adjusting the phase after assigning a sequence of data packets to new time slots in a sequence of frames. If one employs this procedure, the scheduling delay may iteratively be reduced until it reaches a certain level, e.g., until it becomes minimal or falls below a predefined scheduling delay limit.

The speech processing unit performs encoding and decoding tasks for various channels. Therefore it is beneficial to reduce the scheduling delay not only for data packets associated with a single channel, but for data packets associated with more than one channel and hence one or more radio network nodes. In this case it is necessary for the speech processing unit to control all time alignment requests that are to be processed related to the data packets of different channels. Therefore, the present invention provides a method for storing each time alignment request until it has been fulfilled, and for making use of a specific delay metric to calculate the 'overall' scheduling delay for the data packets of the different channels. One example of a suitable metric is the sum of all absolute delay values of channels for which time alignment is to be performed. However, as will be apparent to one skilled in the art, other metrics may also be suitable. The scheduling delay may then be reduced for all channels for which combined time alignment is performed.

With this approach, the scheduling delay may be optimized for all channels that are to be processed in the speech processing unit. Hence, with a rather low signaling effort consisting mainly of a one time alignment request for each channel, the scheduling delay may be optimized. If one assumes that the delay is optimized with respect to the above mentioned example of a metric consisting of the sum of all absolute delay values, the 'overall' scheduling delay would thus be minimal. If scheduling delay is optimized, system performance is consequently improved for all involved channels.

The speech processing unit performs encoding and decoding tasks, wherein encoding tasks correspond to the processing of data packets that are to be transferred to radio network nodes in the downlink direction, and wherein decoding tasks correspond to the processing of data packets that are received by the speech processing unit in the uplink direction. It is fairly straightforward to reduce scheduling delay in a single transmission direction. Therefore, the present invention may first reduce the scheduling delay, for example, for downlink encoding tasks of the speech processing unit in the transmission direction from the speech processing unit to the radio network nodes. The present invention may then provide a method for reducing the scheduling delay in the uplink direction. Alternatively, the present invention may first reduce the scheduling delay for uplink decoding tasks of the speech processing unit in the transmission direction from the radio network nodes to the speech processing unit. The present invention may then provide a method for reducing the scheduling delay in the downlink direction.

If data packets are assigned to new time slots of the speech processing unit for the uplink direction, the user may experience audible interferences like unwanted 'clicks' or other unwanted noises. However, there are times during the uplink transmission, for example during speech breaks of a user, when no information is transmitted. In UMTS systems, a discontinuous transmission (DTX) mode is activated if no voice activity of a user is detected. In this case, data packets may be assigned to new time slots, and because no user information is being transmitted, audible interferences are avoided. Therefore, to minimize scheduling delay in this case, it is advantageous to assign data packets as quickly as possible, that is, to the identified target time slot in the first and subsequent frames.

In order to further reduce the scheduling delay between the speech processing unit and the radio network nodes, it becomes clear from the above that scheduling delay needs to be reduced in both transmission directions, downlink and uplink, in a combined manner. The present invention provides a method for reducing the scheduling delay in both transmission directions, that is, the roundtrip delay in a combined manner. The present invention may be implemented as a hardware solution or as a computer program product comprising program code portions for performing the steps discussed above when the computer program product is run on a computing device. The computer program product may be stored on a data carrier in fixed association with or removable from the computing device.

The scheduling delay may be further reduced if the steps of assigning a data packet to a new time slot and adjusting the phase are performed more than one time and hence for more than one frame. Therefore, the present invention provides a device that assigns data packets associated with a channel to new time slots in a sequence of frames, and adjusts the phase for the same sequence of frames, thereby further reducing the scheduling delay.

As also described above, the scheduling delay may be reduced for data packets that are associated with more than one channel and one or more radio network nodes. In this case, the speech processing unit needs to control all of the time alignment requests that are to be processed related to the data packets of different channels. Therefore, the present invention provides a device capable of storing each time alignment request until it has been fulfilled, and making use of a specific delay metric to calculate the 'overall' scheduling delay for the data packets associated with more than one channel and one or more radio network nodes. Independent of whether a simple or sophisticated delay metric is applied, the device is capable of optimizing the scheduling delay with respect to the delay metric.

Referring to FIG. 1, a speech processing unit (SPU) 100 and a radio network node 110 are shown. Communication may either be performed from the SPU to the radio network node (i.e., the downlink direction 120) or from the radio network node to the SPU (i.e., the uplink direction 130).

Figure 2:
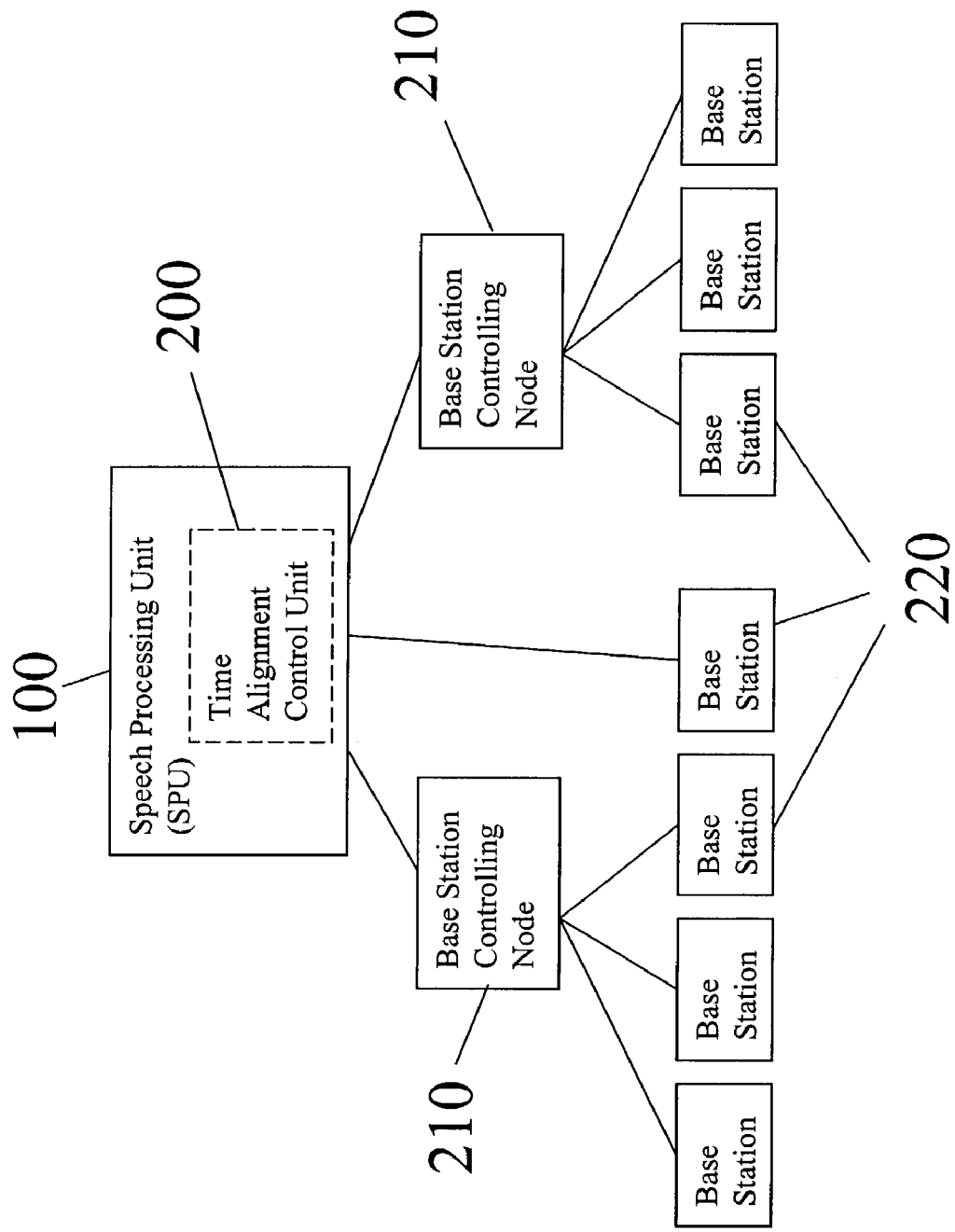
FIG. 2 is a block diagram of a part of a communication system consisting of a speech processing unit and several radio network nodes.

FIG. 2 is a block diagram of a part of a communication system consisting of the SPU 100 and several radio network nodes. The SPU may be incorporated in, for example, a mobile switching center (MSC) or a media gateway. The time alignment control unit 200 may be implemented as part of the SPU, as shown in FIG. 2, or it may be constructed as a separate device connected to the SPU. The radio network node 110 may be a base station controlling node such as a Radio Network Controller (RNC) 210, or a Base Station (BS) 220. Correspondingly, the SPU may either be connected to the RNC or the BS. As apparent to one skilled in the art, the network nodes of FIG. 2 are only of exemplary character. Therefore, the SPU may be connected to any other node of a radio access network. In this context it should be noted that the SPU may be connected to a radio network node directly or indirectly, in case the SPU is, for example, part of an MSC or a media gateway.

Figure 3A:
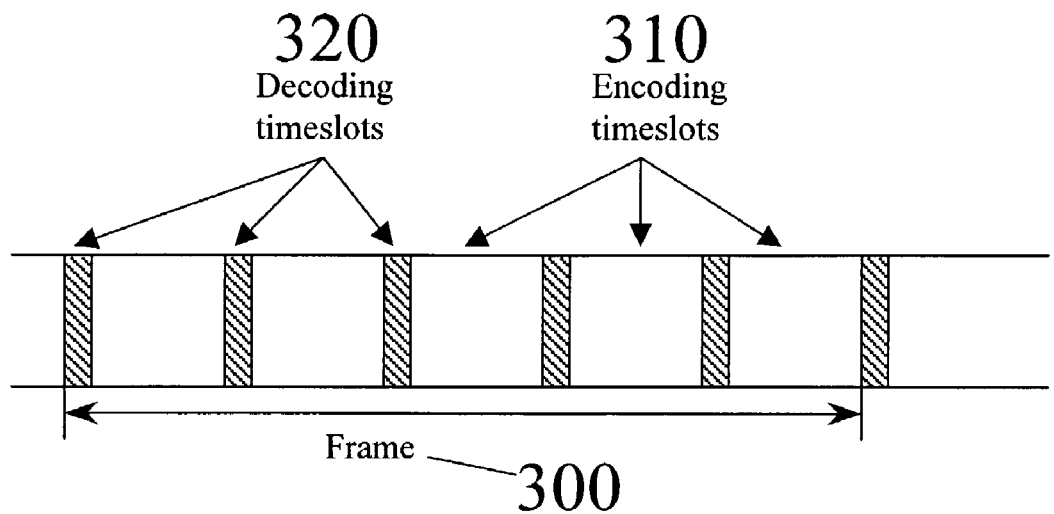
FIGS. 3a-3b are diagrams of a frame that consists of several time slots for encoding and decoding tasks.
Figure 3B:
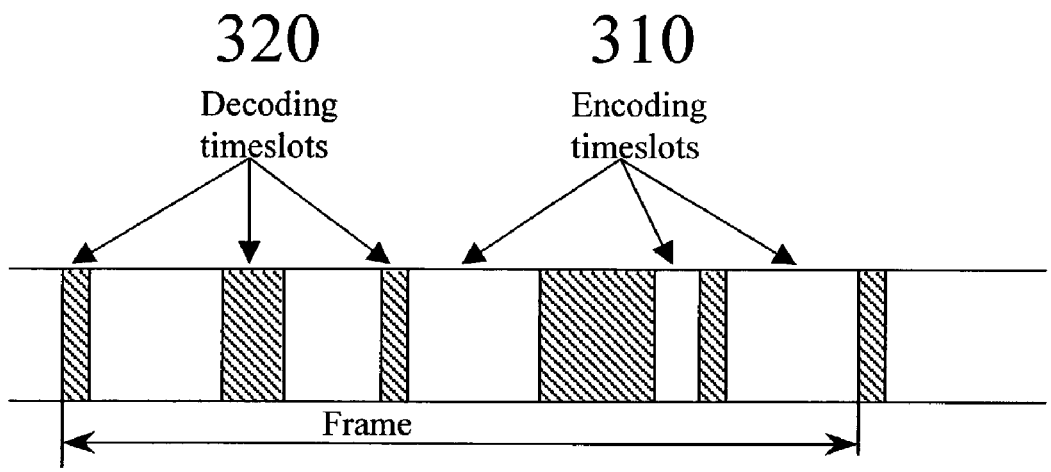

FIGS. 3a-3b are diagrams of a frame that consists of several time slots for encoding and decoding tasks. The SPU 100 is responsible for encoding and decoding tasks, where one or more DSPs within the SPU may perform these tasks. Speech processing is performed in frames 300 of a particular duration such as 20 ms. Each frame is subdivided into a plurality of time slots. Some of the time slots may be assigned to encoding tasks 310, while other time slots are used for decoding tasks 320, as depicted in FIG. 3a. FIG. 3a shows a possible division of a frame into equidistant encoding and decoding time slots. As will be apparent to one skilled in the art, a frame may also be subdivided into time slots of unequal length as shown in FIG. 3b. Like FIG. 3a, the time slots in FIG. 3b are also assigned to encoding or decoding tasks. The manner in which a frame is divided into different time slots is beyond the scope of the present application, and need not be discussed in detail herein.

Figure 4A:
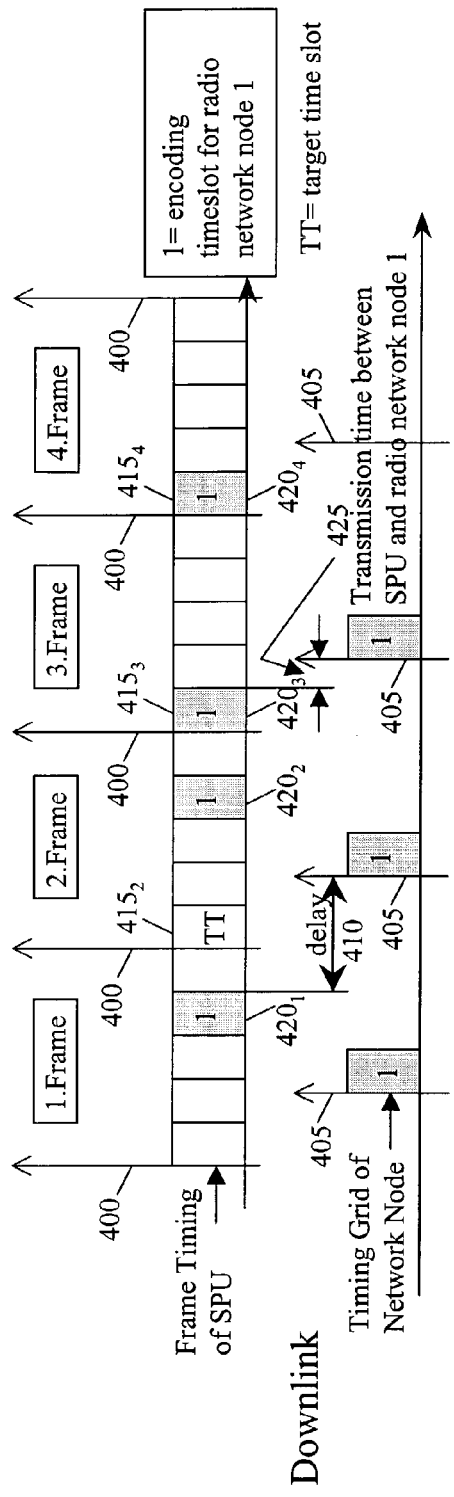
FIGS. 4a-4b are diagrams illustrating transmission between a speech processing unit and a radio network node in downlink and uplink, respectively.
Figure 4B:
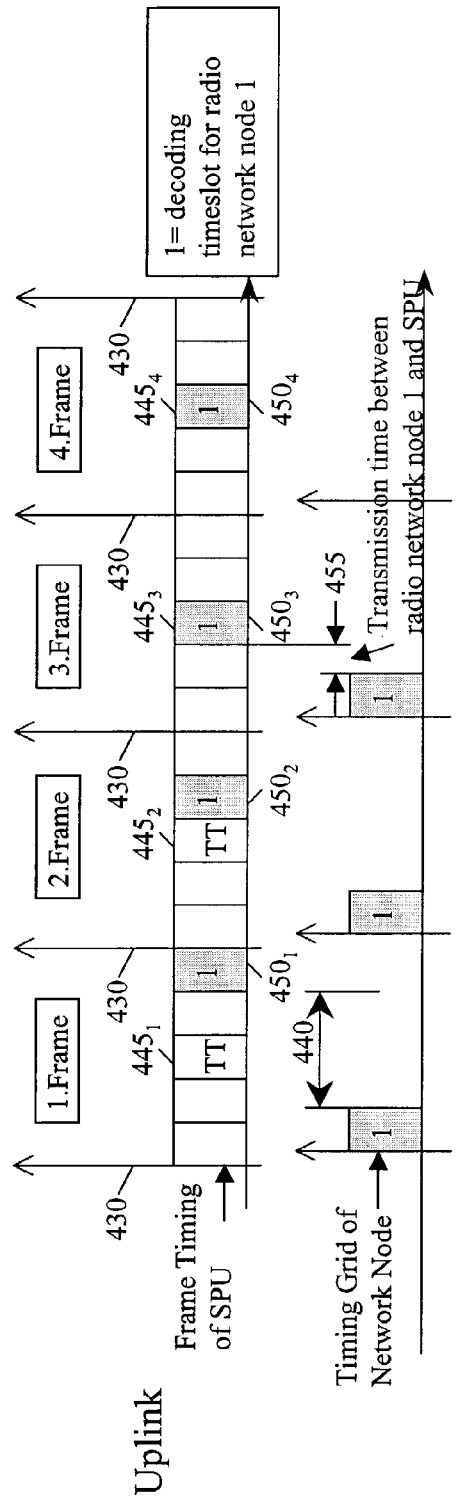

FIGS. 4a and 4b are diagrams illustrating transmission between a speech processing unit and a radio network node in the downlink and the uplink directions. While FIG. 4a refers to transmission in the downlink direction, i.e. from the SPU 100 to the radio network node, FIG. 4b refers to the reverse transmission direction, i.e. the uplink direction from the radio network node to the SPU. Processing of data packets in the SPU is based on frames. The beginning of a frame in FIG. 4a is indicated by each of the vertical arrows 400. In the illustrated example, each frame consists of five time slots of equal length as shown by the grid for each frame.

As is apparent to one skilled in the art, the timing grid of FIG. 4a for the processing of frames in the SPU is generally not synchronized with the timing grid for processing data in the radio network node. As a consequence, data packets to be processed in the SPU usually suffer from severe scheduling delays. Such a delay 410 is depicted in FIG. 4a, and extends from the end of the data packet's time slot in the SPU until the beginning of processing in the radio network node, as shown by vertical arrows 405. In order to reduce this delay, the SPU first identifies the target time slot (TT) $415_2$, $415_3$, $415_4$, which is the time slot in each frame that yields the minimum scheduling delay between the end of the time slot in the SPU, and the beginning of further processing of data in the corresponding radio network node. This target time slot is identified independent of whether the target time slot is currently in use by other tasks or whether it is available for new assignments. The target time slot is selected so that once the data processed in the target time slot are sent to the corresponding radio network node, they can immediately be further processed or be transmitted to the mobile station.

After the target time slot 415 has been identified in each frame, time slots $420_1$, $420_2$, $420_3$, $420_4$, responsible for processing data in the SPU for a specific radio network node are reassigned to new slots within subsequent frames in order to reduce scheduling delay. This may be done in several steps over a sequence of frames until assignment of the target time slot has been reached, or may be performed in a single step as shown in FIG. 4a. In the $1^{st}$ and $2^{nd}$ frames, the time slot in use for radio network node 1 is the fourth slot $420_1$, $420_2$. In the $3^{rd}$ and following frames, the time slot in use for radio network node 1 has been reassigned to the $1^{st}$ time slot in the frame $420_3$, $420_4$, which is identical to the target time slot $415_3$, $415_4$ for each frame respectively. After the time slot $420_1$ has been reassigned to a new slot within a frame, a phase adjustment may be necessary, i.e. superfluous data packets to be transferred to the same radio network node may need to be erased. In FIG. 4a, this means that the outcome of the processing of time slot $420_2$ will be erased, since the result of time slot $420_3$ can be transmitted to the corresponding radio network node with minimal delay 425. This minimal delay is mainly determined by the transmission time between the SPU and the radio network node.

The beginning of a frame in FIG. 4b in the uplink direction is indicated by each of the vertical arrows 430. In the illustrated example, each frame consists of five time slots of equal length as shown by the grid for each frame. Once again, however, the timing grid for the processing of frames in the SPU is generally not synchronized with the timing grid for processing data in any radio network node. As a consequence, data packets to be processed in the SPU usually suffer from severe scheduling delays. Such a delay 440 is depicted in FIG. 4b, and extends from the end of the processing in the radio network node until the beginning of the data packet's time slot in the SPU. In order to reduce this delay, the SPU at first identifies the target time slot (TT) $445_1$, $445_2$, $445_3$, $445_4$, which is the time slot that yields the minimum scheduling delay between the end of processing in the radio network node and further processing of data packets in the SPU. This target time slot is identified independent of whether the target time slot is currently in use by other tasks or whether it is available for new assignments. Furthermore, during uplink transmission as shown in FIG. 4b, the target time slot begins at the specific moment that any data that are transmitted from a radio network node to the SPU can immediately be further processed.

After the target time slot has been identified, the time slot in each frame responsible for processing data packets for a specific radio network node, here slots $450_1$, $450_2$, $450_3$, $450_4$, are changed in order to reduce scheduling delay. This may be done in several steps over a sequence of frames until assignment of the target time slot has been reached, or may be performed in a single step as shown in FIG. 4b. The time slot in use for radio network node 1 is the $5^{th}$ time slot $450_1$ in the $1^{st}$ frame and the fourth slot $450_2$ in the $2^{nd}$ frame. In the $3^{rd}$ and following frames the time slot in use for radio network node 1 has been reassigned to the $3^{rd}$ time slot in the frame, $450_3$, $450_4$ which is identical to the target time slot $445_3$, $445_4$ for the $3^{rd}$ and $4^{th}$ frames respectively. After the time slot $450_1$ has been reassigned to a new slot within a frame, a phase adjustment may be necessary, i.e. superfluous data packets may need to be erased. The minimal delay 455 is mainly determined by the transmission delay between the radio network node and the SPU.

Figure 5:
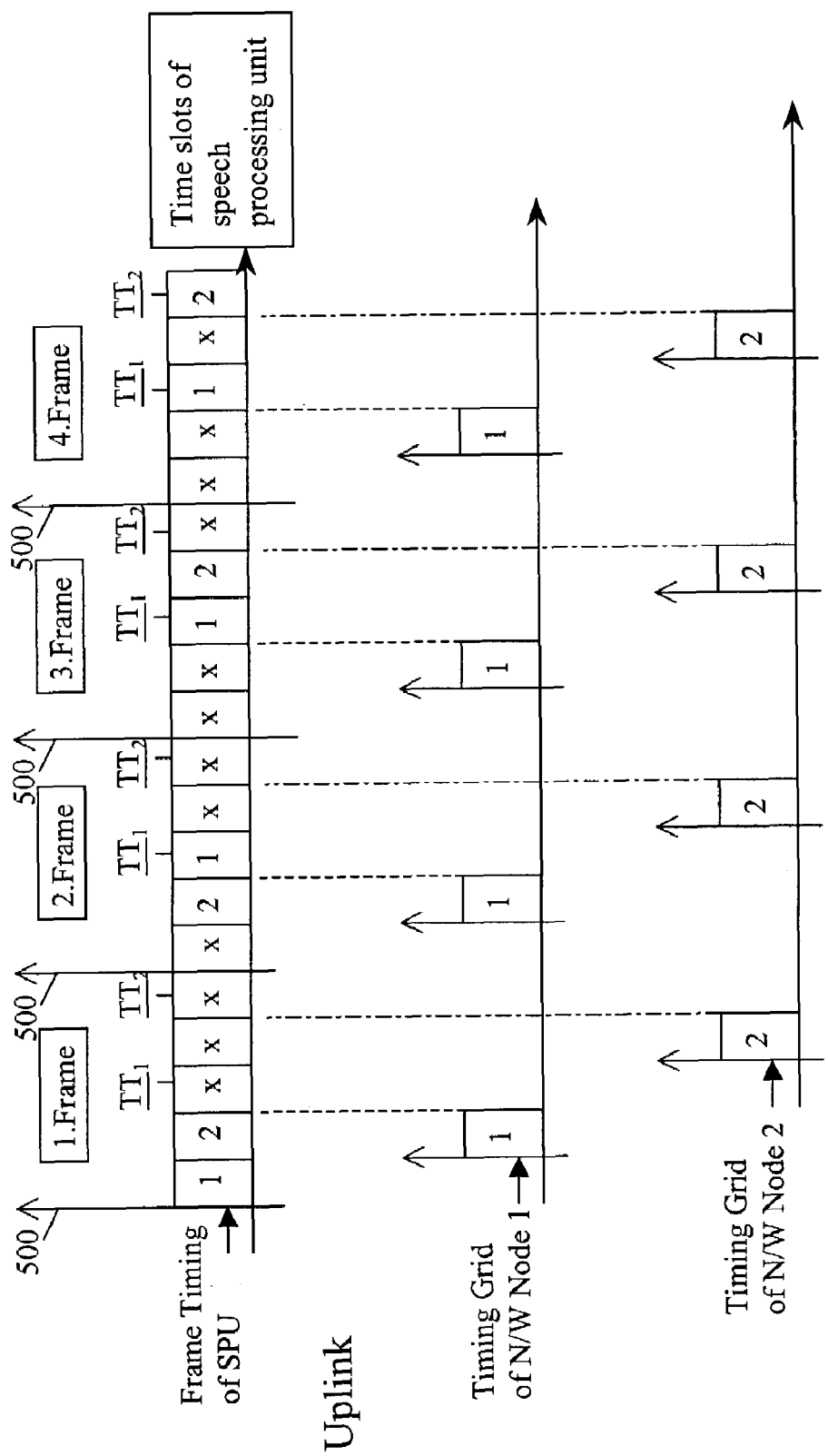
FIG. 5 is a diagram illustrating uplink transmission between a speech processing unit and two radio network nodes.

FIG. 5 is a diagram illustrating uplink transmission between a SPU, radio network node 1, and radio network node 2. The beginning of each SPU processing frame in FIG. 5 is indicated by a vertical arrow 500. In the illustrated example, each frame consists of five time slots of equal length as shown by the grid for each frame. Time slots marked by the symbol 'x' are currently processing data packets of radio network nodes other than radio network node 1 or 2. The timing grids of the two radio network nodes are also shown. The beginning of each processing period in radio network node 1 is indicated by vertical arrows 510, and the beginning of each processing period in radio network node 2 is indicated by vertical arrows 520.

The target time slot for network node 1 ($TT_1$) with respect to minimal scheduling delay is the third time slot of each SPU frame. The target time slot for network node 2 ($TT_2$) is the fifth time slot of each SPU frame. In SPU frame 1, speech processing tasks for radio network node 1 are performed in the first time slot. In the second, third, and fourth frames, the assignment is changed to the third time slot. An immediate change from any time slot in a frame of the speech processing unit to the corresponding target time slot may in particular be done in the uplink, if the discontinuous transmission (DTX) mode is applied. If the used time slot is changed and phase adjustment is performed while DTX mode is used, audible defects or disturbances are avoided.

Regarding radio network node 2, speech processing tasks for radio network node 2 are performed in the second time slot in SPU frames 1 and 2. After these first two frames, the assignment is changed to the fourth time slot in frame 3, and to the fifth time slot in frame 4. Therefore, the assignment of the target time slot is achieved in an iterative manner according to the present invention.

While the present invention has been described with respect to particular embodiments, those skilled in the art will recognize that the present invention is not limited to the specific embodiments described and illustrated herein. Therefore, while the present invention has been described in relation to its preferred embodiments, it is to be understood that this disclosure is only illustrative in nature. Accordingly, it is intended that the invention be limited only by the scope of the claims appended hereto.

What is claimed is:

1. A method of reducing a scheduling delay in a speech processing unit communicating with a radio network node, wherein data packets associated with a single channel are processed in the speech processing unit in a plurality of time slots that are subunits of frames, the method comprising the steps of:
    a) receiving a time alignment request from the radio network node, said time alignment request including timing information identifying a beginning and an ending of processing periods in the radio network node;
    b) selecting in the speech processing unit, one of the time slots within a first frame as a target time slot, said target time slot having a position within the first frame such that the scheduling delay between the ending of a processing period in the radio network node and the beginning of the target time slot is minimized;
    c) assigning a data packet associated with the channel to the target time slot within the first or a subsequent frame such that the scheduling delay in the speech processing unit is reduced; and
    d) adjusting the phase of the frame after assigning the data packet to the target time slot by erasing superfluous data packets;
    wherein the speech processing unit communicates with a plurality of radio network nodes over a different channel with each node, and the scheduling delay in the speech processing unit is reduced for each channel, and the method further comprises the steps of:
    calculating a scheduling delay metric representative of an overall scheduling delay in the speech processing unit for the data packets of the different channels; and
    storing each time alignment request received from each radio network node until each time alignment request has been fulfilled.

2. The method according to claim 1 wherein the overall scheduling delay in the speech processing unit is optimized with respect to the scheduling delay metric.

3. The method according to claim 2 wherein the scheduling delay in the speech processing unit is reduced for data packets scheduled for transmission from the speech processing unit to the radio network nodes.

4. The method according to claim 2 wherein the scheduling delay in the speech processing unit is reduced for data packets transmitted from the radio network nodes to the speech processing unit.

5. The method according to claim 4 further comprising assigning data packets to the target time slot in the first and subsequent frames if no user information is transmitted.

6. A device within a speech processing unit for reducing a scheduling delay in the speech processing unit for data packets being transmitted to or from a radio network node, wherein data packets associated with a single channel are processed in the speech processing unit in a plurality of time slots that are subunits of frames, the device comprising:
    means for receiving a time alignment request from the radio network node, said time alignment request including timing information identifying a beginning and an ending of processing periods in the radio network node;
    means for utilizing the timing information to select one of the time slots within a first frame as a target time slot, said target time slot having a position within the first frame such that the scheduling delay between the ending of a processing period in the radio network node and the beginning of the target time slot is minimized;
    means for assigning a data packet associated with the channel to the target time slot within the first or a subsequent frame such that the scheduling delay in the speech processing unit is reduced; and
    means for adjusting the phase of the frame after assigning the data packet to the target time slot by erasing superfluous data packets;
    wherein the speech processing unit communicates with a plurality of radio network nodes over a different channel with each node, and the scheduling delay in the speech processing unit is reduced for each channel, said device further comprising:
    means for calculating a scheduling delay metric representative of an overall scheduling delay in the speech processing unit for the data packets of the different channels; and
    means for storing each time alignment request received from each radio network node until each time alignment request has been fulfilled.

7. The device according to claim 6 further comprising means for optimizing the overall scheduling delay in the speech processing unit with respect to the delay metric.

* * * * *